United States Patent [19]
Hsieh

[11] Patent Number: 5,212,434
[45] Date of Patent: May 18, 1993

[54] PHASE-LOCKED STEP MOTOR SPEED SERVO CONTROLLER

[75] Inventor: Guan-Chyun Hsieh, Hsin-Tien, Taiwan

[73] Assignee: National Science Counsil, Taiwan

[21] Appl. No.: 852,698

[22] Filed: Mar. 17, 1992

[51] Int. Cl.$^5$ .......................................... G05B 11/06
[52] U.S. Cl. ..................... 318/603; 318/608; 318/696; 388/805; 388/911; 388/912
[58] Field of Search ................. 318/603, 606–608, 318/685, 696, 810; 388/805, 809, 812–814, 908, 911, 912

[56] References Cited

U.S. PATENT DOCUMENTS

| 3,626,267 | 12/1971 | Bobbitt | 318/686 |
| 3,686,469 | 8/1972 | Clark et al. | 179/100.2 |
| 3,828,168 | 8/1974 | O'Callaghan et al. | 235/150.1 |

OTHER PUBLICATIONS

IEEE Transactions on Industrial Electronics, "PLL Speed Regulation of Fractional Horsepower Series and Universal Motors", vol. IE-31, No. 3, Aug. 1984, pp. 277–281.

Primary Examiner—William M. Shoop, Jr.
Assistant Examiner—Brian Sircus
Attorney, Agent, or Firm—Fish & Richardson

[57] ABSTRACT

A speed controller is equipped to a step motor for controlling the rotation of the step motor with a desired angular velocity. The step motor speed controller utilizes a phase-locked stepping servomechanism (PLSS) in which a phase-controlled oscillator (PCO) comprised of an adaptive digital-pumped controller (ADPC) and a voltage-controller oscillator (VCO) is employed. The step motor speed controller utilizes a tachometer comprised of an optical encoder for detecting the angular speed of the step motor. The tachometer sends out a first pulse train with the frequency thereof indicating the angular velocity of the step motor as a feedback signal to the ADPC. A reference signal source is employed for sending a second pulse train to the ADPC. The ADPC compares the phase difference between the first pulse train and the second pulse train and whereby a signal corresponding the phase difference is sent to the VCO, causing the VCO to output a third pulse train to the step motor. The generated third pulse is thus used to drive the step motor.

3 Claims, 12 Drawing Sheets

PHASE-LOCKED STEP MOTOR SPEED SERVO CONTROLLER

BACKGROUND OF THE INVENTION

1. Field of the Invention

The present invention relates to a servo control system, and more particularly, to a servo control system utilizing a phase-locked technique for controlling the speed of a step motor.

2. Description of Prior Art

A step motor is an electromagnetic incremental actuator that converts input pulses to shaft rotation. Since pulse trains are digital signals, controllers for driving step motors can be combined with digital systems. Phase-locked techniques have been widely used in servo control systems of step motors. The control may be related to controls of the shaft of a step motor to rotate accurately at a desired angular speed, or related to positioning controls of an movable member driven by the step motor.

Among the known phase-looked techniques, a charge-pump phase-locked servo system employing a phase detector and a passive RC filter is disclosed in a technical paper "*PHASE-LICKED LOOPS FOR MOTOR-SPEED CONTROL*" proposed by Moore and published on *IEEE SPECTRUM*, Vol. 10, pp. 61–67, April 1973. Up to the present time, loop controllers employed in phase-locked systems are often of a charge-pump type. A charge pump controller basically consist of a phase detector (PFD) and a loop filter which can be either passive or active. During each pumping period, the pumped voltage sent out by the loop filter increases exponentially with the characteristic curve thereof much alike to that of an RC circuit. As a result, there is a non-linear relationship between the pumped voltage and the input phase error, which causes the phase-locked system to respond to the phase error variations differently in different speed ranges of the step motor.

In addition, at the instant during each pumping period when a phase error is detected, an impulse-like voltage jump always appears in the loop filter, which appears eventually as part of the output of the charge-pump controller. The impulse-like voltage jump seriously affects performances in the control of a step motor.

Furthermore, speed transducers employed for detecting the angular speed of a step motor are usually of a type which utilizes an optical encoder. The function of the optical encoder is equivalent to a frequency multiplier, i.e. a complete revolution of the step motor shaft will actuate the optical encoder to generate a predetermined number of pulses. The predetermined number is technically referred to as a line density of the optical encoder. Therefore, the angular speed of the step motor can be determined by measuring the frequency (pulses per second) of the output pulse train of the optical encoder. The larger the line density, the higher the speed resolution becomes.

It is, however, found by Margaris and Petridis that a design choice with a higher line density for the optical encoder causes the step motor speed servo controller to have a lower system stability. The discovery is described in a technical paper "*PLL SPEED REGULATION OF FRACTIONAL HORSEPOWER SERIES AND UNIVERSAL MOTORS*" on *IEEE TRANSACTIONS ON INDUSTRIAL ELECTRON*, Vol. IE-31, pp. 277–281, Aug. 1984. Accordingly, a tradeoff often has to be made between line density and system stability.

SUMMARY OF THE INVENTION

The object of the present invention is to provide a step motor speed servo control system which employs an adaptive digital pump controller (ADPC) to overcome the drawbacks of the same system employing the conventional charge-pump type controllers.

The control mechanism that is established by the ADPC is referred to as a phase-locked stepping servo-mechanism (PLSS). The step motor speed controller according to the present invention utilize a PCO, which consists of an ADPC and a VCO, as the controller for the step motor. The step motor speed controller in accordance with the present invention has a real-time adaptive control capability. The PCO provides a phase-locked range of $[-2\pi, 2\pi]$, within which the associated train of pulses will be used as the driving signal for the PLSS.

The PCO controller employs a multi-rate sampling technique with the property of linear quantization. The speed of the step motor controlled by the speed controller according to the present invention can be linearly and stably controlled. Since the phase-locked technique is able to provide a very wide lock-in range, it is not necessary for the VCO to provide a predetermined control profile. The PLSS is able to provide the optimum control signal adaptively for the step motor. The step motorspeed controller which utilizes the phase-locked servo mechanism in accordance with the present invention has been proved, both in theory and in practice, to be adaptive, accurate, and reliable.

The parameters that are considered in the design of the step motor speed controller according to the present invention includes the multi-sampling rate N, the jump voltage P, the sampling period T, and the VCO gain Kv. The present invention employs the Laplace and the z-transform for the simulation and analysis of the PLSS. In stability analysis, the system of the step motor speed controller is complicated since the step motor characteristics are very non-linear. A computer-aided graphical method is used for the design of the step motor speed controller of the present invention. In a preferred embodiment of the present invention, the speed range of the PLSS lies in 40–1000 rpm and a speed regulation of ±0.15 rpm is achieved.

BRIEF DESCRIPTION OF THE DRAWINGS

The present invention can be more fully understood by reading the subsequent detailed description of the preferred embodiments thereof with references made to the accompanying drawings, wherein.

DETAILED DESCRIPTION OF THE PREFERRED EMBODIMENTS

1. Configuration of a Step Motor Speed Servo Controller

Figure 1:
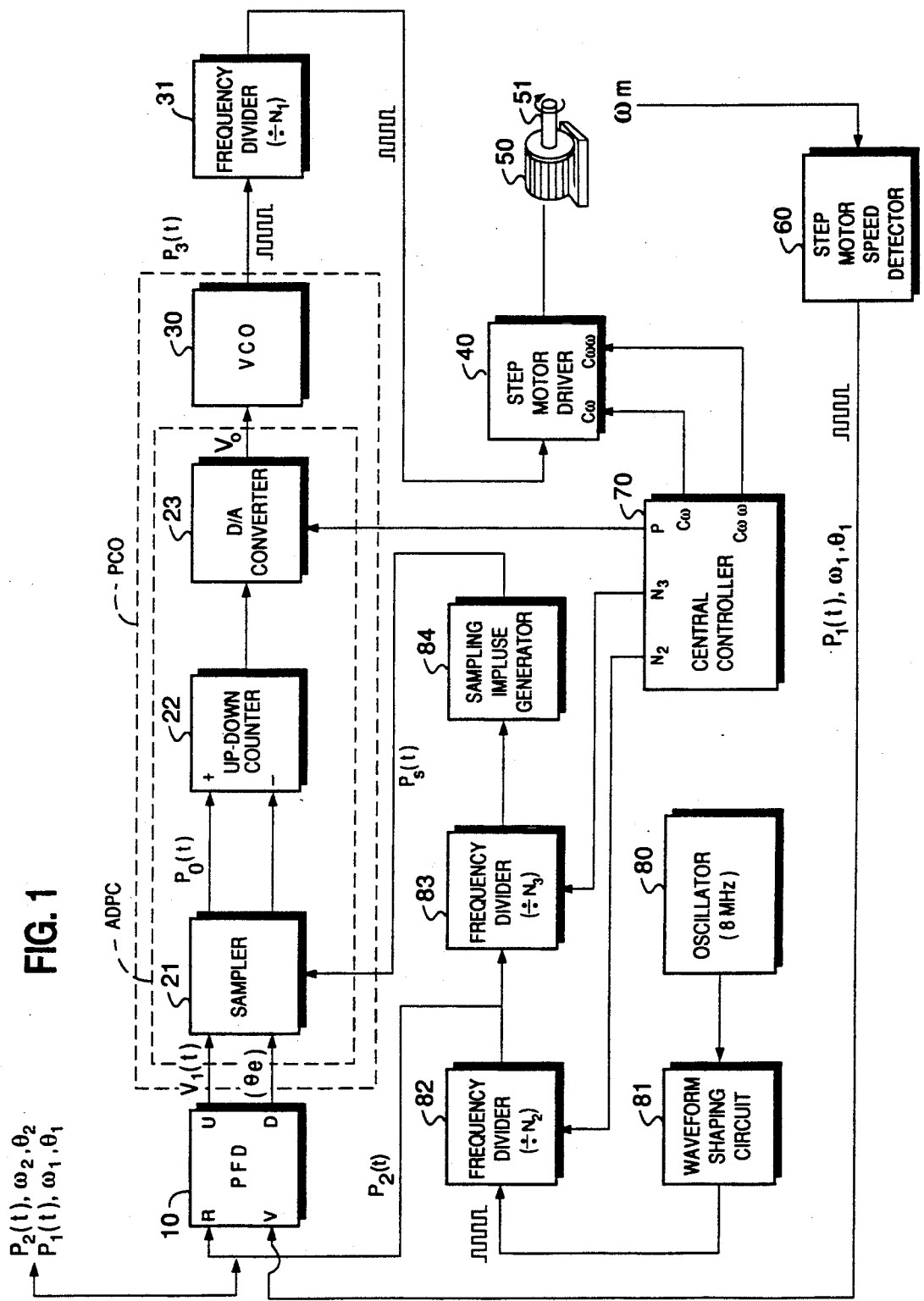
FIG. 1 is a block diagram of a step motor speed servo control system according to the present invention.

Referring to FIG. 1, there is shown a schematic block diagram of a step motor speed controller in accordance with the present invention utilized for control the speed of a step motor 50. The step motor speed controller employs a speed detector 60 which is of the type composed of an optical sensor and encoder (both are not shown). The optical sensor is coupled to the shaft 51 of the step motor 50 in such a way that a complete rotation of the shaft 51 will cause the optical sensor to generate n pulses, i.e line density=n. Accordingly, when the step motor 50 is running at an angular velocity $w_m$ (rad/sec), the optical sensor generates a pulse train with a frequency $f_o = (w_m/2\pi) \cdot n$ (pulses per second).

The encoder is a waveform-shaping circuit capable of transforming a pulse received thereby into a pulse having a 50% duty cycle. The output pulse train of the encoder will be used as a feedback signal of the step motor 50 and which will be hereinafter designated by $P_1(t)$.

The step motor speed servo controller further employs a phase detector 10 having a first input port V and a second input port R. The first input port V is connected to the output of the encoder to receive the feedback signal $P_1(t)$ therein. The second input port is used for the input of a reference signal whose frequency is denoted by $f_2$ and whose phase is denoted by $\Theta_2$.

An oscillator 80, a waveform-shaping circuit 81, and a divide-by-$N_2$ frequency divider 82 are utilized cooperatively for the generation of the reference signal. The oscillator 80 is a fixed frequency generator which is capable of generating a sinusoidal signal with a frequency 8M Hz. The sinusoidal signal generated by the oscillator 80 is subsequently processed by the waveform-shaping circuit 81 to transform each of the sinusoidal alternations thereof into a pulse having a duty cycle of 50%. The pulse train sent out by the wave-shaping circuit thus has a frequency 8M Hz.

Figure 2:
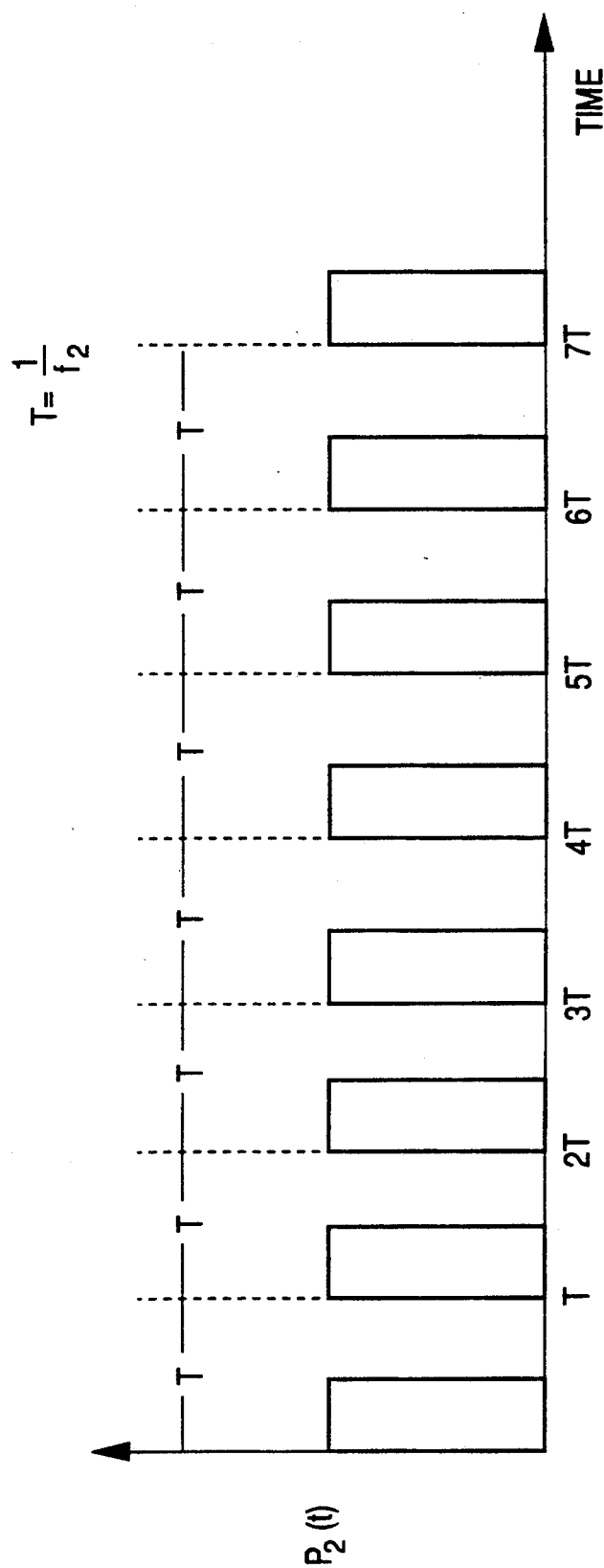
FIG. 2 shows the waveform diagram of a reference signal utilized in the step motor speed servo control system of FIG. 1.

The value $N_2$ with which the divider 82 uses to divide the frequency of the pulse train sent out by the wave-shaping circuit 81 is predetermined through the control of a central controller 70. The central controller 70 is adapted to be responsive to a speed selection for the step motor 50 to generate a proper value of $N_2$ so that the frequency of the reference signal $P_2(t)$ corresponds to the desired speed of the step motor 50. The waveform of the reference signal $P_2(t)$ is shown in FIG. 2, wherein the period T is equal to $1/f_2$. The duration between two consecutive pulses of the reference signal $P_2(t)$ will be hereinafter specifically referred to as a pumping period.

Figure 3A:
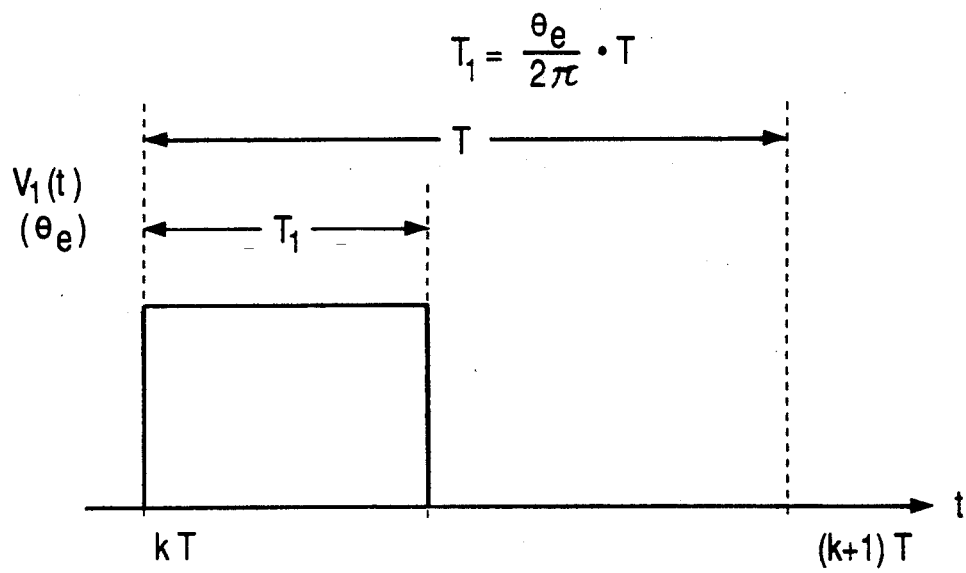
FIGS. 3A–3C are waveform diagrams utilized for depicting the sampling of a phase-error signal $V_1(t)$ having a positive magnitude.

The difference between the phase $\Theta_1$ of the feedback signal $P_1(t)$ and the phase $\Theta_2$ of the reference signal $P_2(t)$ is referred to as a phase error and is designated by $\Theta_e$, i.e. $\Theta_e = \Theta_1 - \Theta_2$. The phase detector 10 is capable of comparing during each period T the difference between the phase $\Theta_1$ of the feedback signal $P_1(t)$ with the phase $\Theta_2$ of the reference signal $P_2(t)$ and generating thereby a square pulse with the duration thereof in proportion to the phase error $\Theta_e$. The waveform of the square pulse representing the phase error $\Theta_e$ is shown in FIG. 3A. Since the maximum phase error value is $2\pi$, the duration $T_1$ of the square pulse shown in FIG. 3A is:

$$T_1 = (\Theta_e/2\pi) \cdot T \quad (1)$$

If the phase $\Theta_1$ of the feedback signal $P_1(t)$ lags the phase $\Theta_2$ of the reference signal $P_2(t)$, the square pulse generated by the phase detector 10 is with a positive magnitude as shown in FIG. 3A and which will be sent out from the first output port U. If the phase $\Theta_1$ of the feedback signal $P_1(t)$ leads the phase $\Theta_2$ of the reference signal $P_2(t)$, the square pulse generated by the phase detector 10 is with a negative magnitude as shown in FIG. 4A and which will be sent out from the first output port U.

The phase error signal $\Theta_e$ sent out by the phase detector 10 is subsequently received by a sampler 21. The sampler 21 samples the square pulse in the phase error signal $\Theta_e$ with a sampling signal $P_s(t)$. The sampling signal $P_s(t)$ is a periodic impulse train having a period equal to T/N, where N is a predetermined integer number. The integer number N is an important parameter which is vital to the performance of the servo control system according to the present invention. A discussion of how it is determined will be described later. For now only the function of each constituting block of FIG. 1 will be described.

Figure 3B:
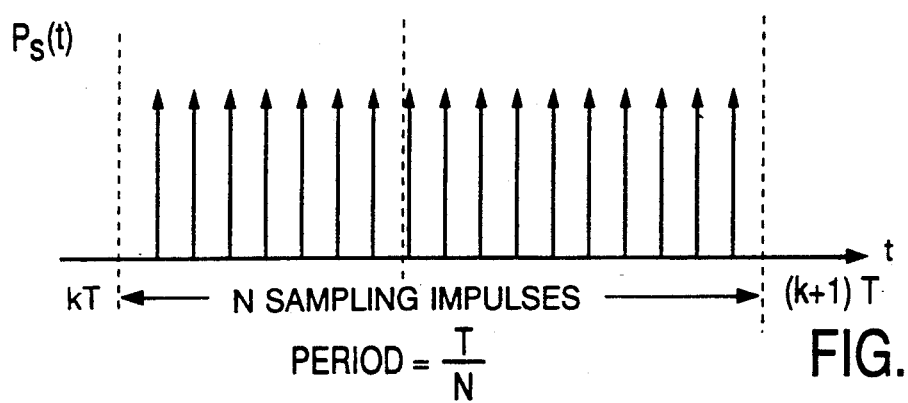
Figure 3C:
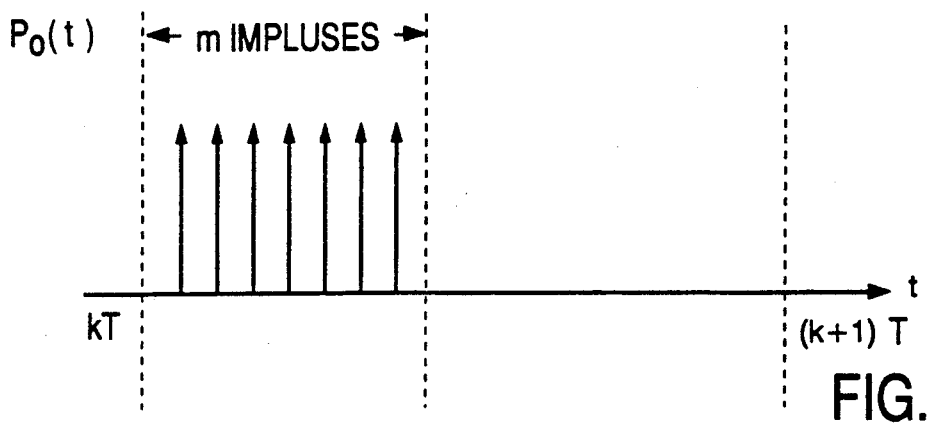

The generation of the sampling signal $P_s(t)$ is achieved by processing the output of the divide-by-$N_2$ frequency divider 82, i.e. the reference signal $P_2(t)$, with a divide-by-$N_3$ frequency divider 83 and a sampling impulse generator 84. After the integer N is determined, a corresponding value for the number $N_3$ is determined by the central controller so that the output of the divide-by-$N_3$ frequency divider 83 is a periodic pulse train with a period T/N. The sampling impulse generator 84 is capable of generating an impulse every time when there is detected a rising in an input pulse. The resulted sampling If the phase-error signal $V_1(t)$ is with a positive magnitude as shown in FIG. 3A, then after being sampled with the sampling signal $P_s(t)$ shown in FIG. 3B, the resulted sampled signal $P_o(t)$ will be that shown in FIG. 3C.

Figure 4A:
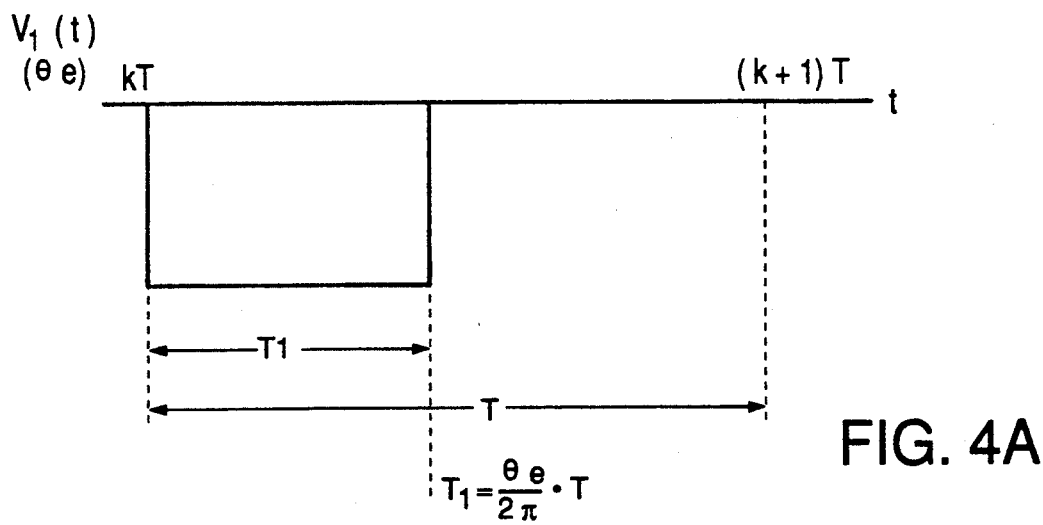
FIGS. 4A–4C are waveform diagrams utilized for depicting the sampling of a phase-error signal $V_1(t)$ having a negative magnitude.
Figure 4B:
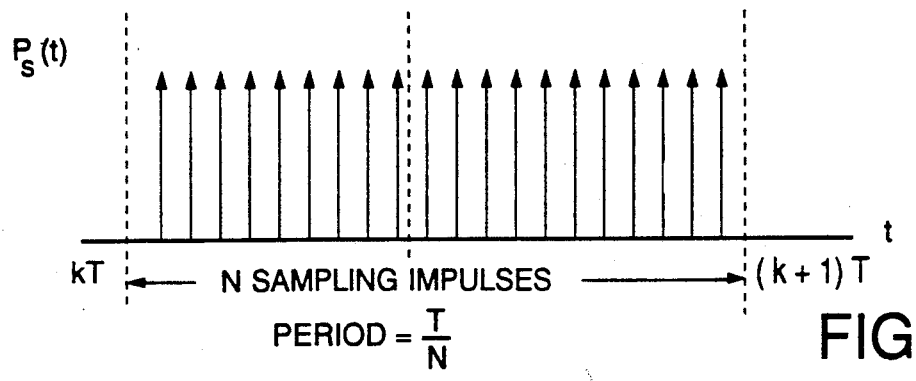
Figure 4C:
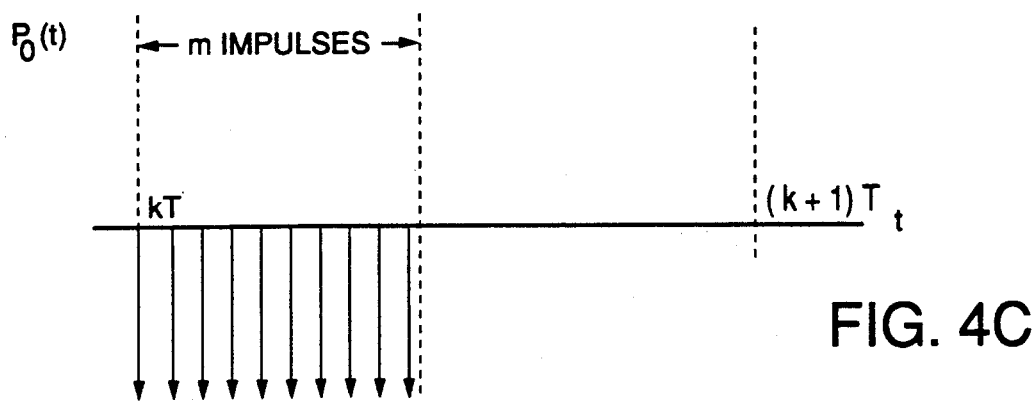

If the phase-error signal $V_1(t)$ is with a negative magnitude as shown in FIG. 4A, then after being sampled with the sampling signal $P_s(t)$ shown in FIG. 4B, the resulted sampled signal $P_o(t)$ will be that shown in FIG. 4C.

The output of the sampler 21 is coupled to an up-down counter 22. A positive pulse sent out from the sampler 21 causes an addition of 1 to the count of the up-down counter 22; and a negative pulse sent out from the sampler 21 causes a subtraction of 1 from the count of the up-down counter 22. The count of the up-down counter is a binary number which is converted by a digital-to-analog converter (D/A converter) 23 into an analog signal $V_o$. The analog signal $V_o$ is a DC voltage with a magnitude proportional to the count of the up-down counter 22.

Since a sampling period T/N is used, there are thus N sampling impulses presented by the sampling signal $P_s(t)$ during a pumping period T. If m is denoted as the number of impulses which will be generated by sampling a phase error with a value $\Theta_e$, it is apparent that:

$$\frac{\Theta_e}{2\pi} = \frac{m}{N} \qquad (2)$$

and accordingly, $$m = \frac{N \cdot \Theta_e}{2\pi} \qquad (3)$$

As a consequence, a phase error $\Theta_e$ will cause the count of the up-down counter 22 to be increased or decrease by $N \cdot \Theta_e/2\pi$.

Figure 5:
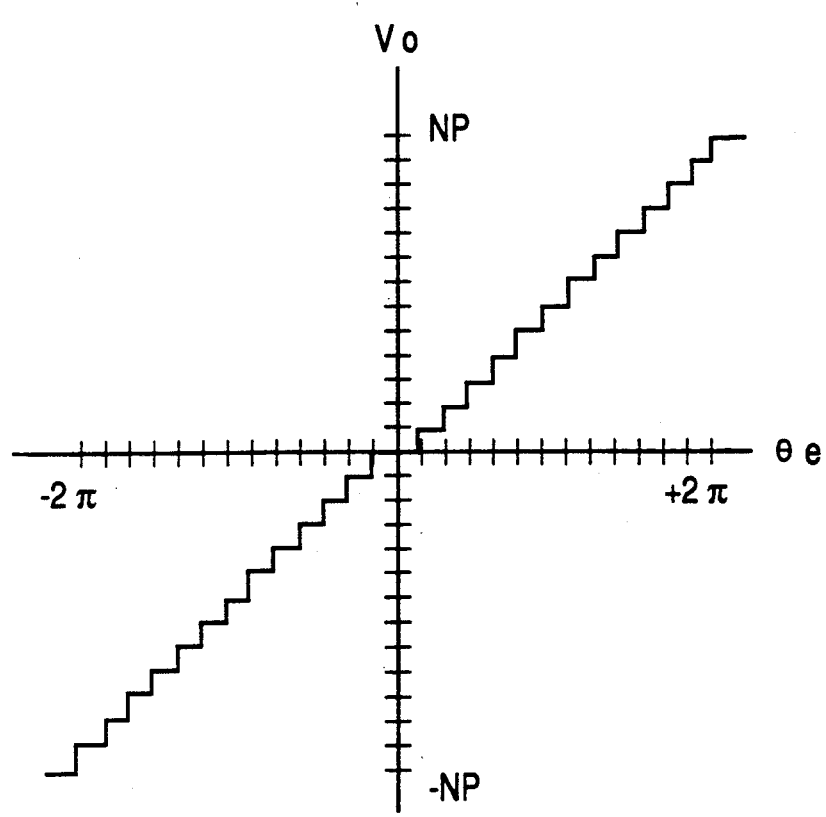
FIG. 5 is a graph, showing a characteristic plot of output voltages versus input phase error for an ADPC.

The output of the up-down counter 22 is subsequently received by a digital-to-analog converter (D/A converter) 23 having a proportionality factor P. The output analog voltage $V_o$ of the D/A converter 23 is therefore:

$$V_o = m \cdot P \qquad (4)$$

$$= \frac{N \cdot P \cdot \Theta_e}{2\pi} \qquad (5)$$

and which will be referred to as a pump voltage. A plot of the output voltage $V_o$ against the phase error $\Theta_e$ in accordance with Eq. (5) is shown in FIG. 5.

Figure 6A:
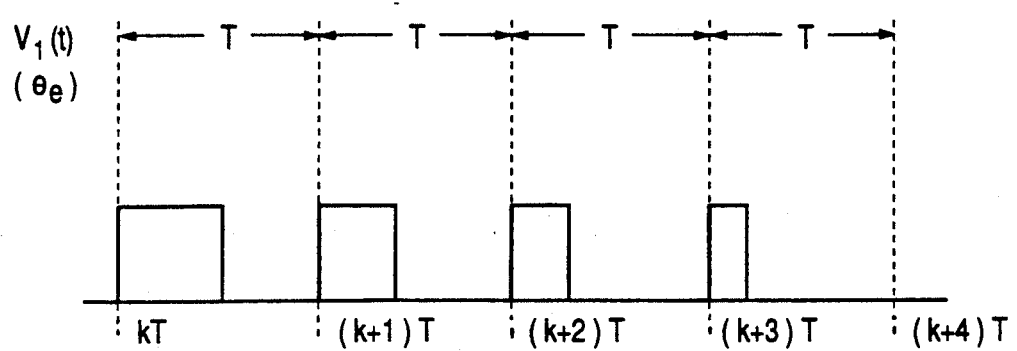
FIGS. 6A-6C are waveform diagrams utilized for depicting how a VCO control voltage is adaptively pumped in the positive direction in accordance with the present invention.
Figure 6B:
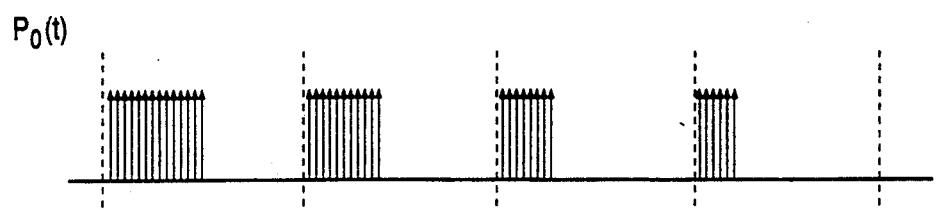
Figure 6C:
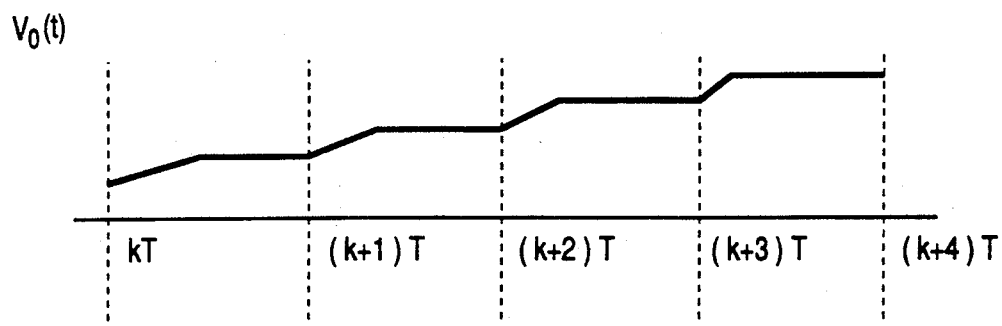

In a phase-lag case, i.e. when $\Theta_e > 0$, the waveforms of the signals $V_1(t)$, $P_o(t)$, and $V_o(t)$ are shown in FIGS. 6A–6C. In the phase-lag case the angular velocity of the step motor 50 is less than a desired value. As can be clearly seen from FIGS. 6A–6C, a phase-lag phase error occurred during a first pumping period causes a rising ramp in the waveform of $V_o(t)$ which in turn causes an increase in the rate of pulses sent out by the VCO 30 to the step motor 50. The angular velocity of the step motor 50 is thus increased. The increased angular velocity causes a smaller phase-lag phase error during the subsequent pumping period following the first pumping period. This feedback control mechanism repeats until the phase error $\Theta_e$ has reached a zero value.

Figure 7A:
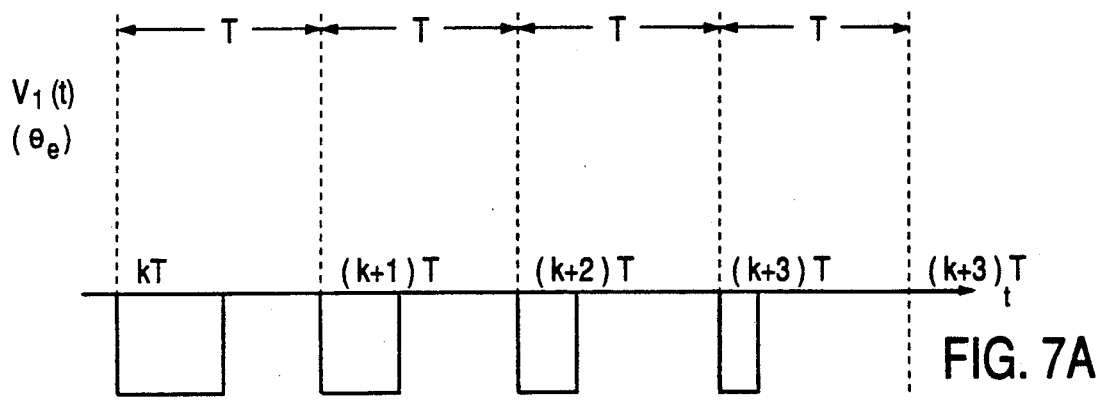
FIGS. 7A-7C are waveform diagrams utilized for depicting how a VCO control voltage is adaptively pumped in the negative direction in accordance with the present invention.
Figure 7B:
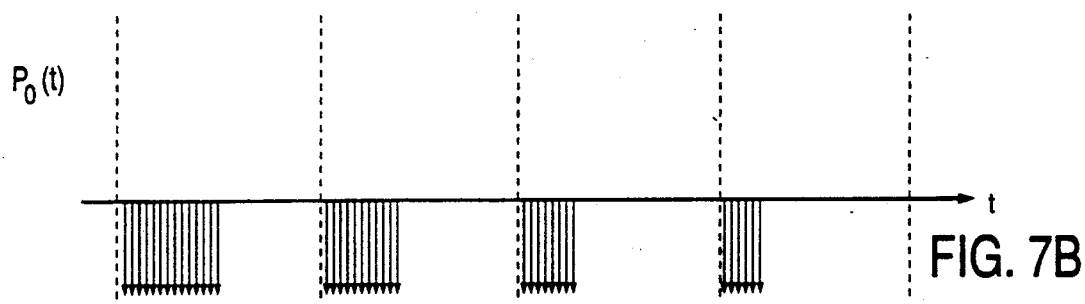
Figure 7C:
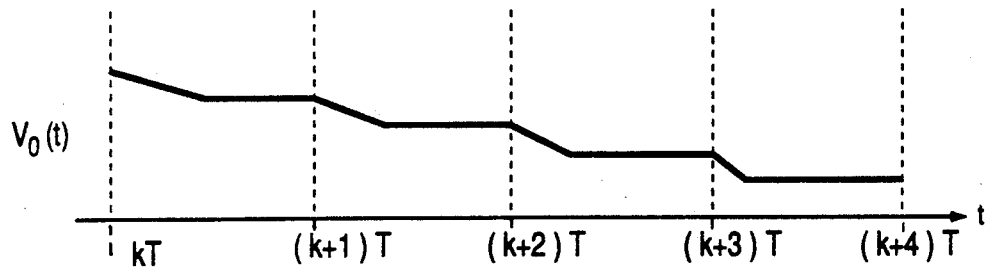

In a phase-lead case, i.e. when $\Theta_e < 0$, the waveforms of the signals $V_1(t)$, $P_o(t)$, and $V_o(t)$ are shown in FIGS. 7A–7C. The mechanism in the phase-lead case is substantially the same as that in the phase-lag case except reversely performed.

The output voltage $V_o$ of the D/A converter 23 is used to trigger a voltage-controlled pulse generator (VCO) 30 to send out a pulse train $P_3(t)$. If the sensitivity of the VCO 30 is $K_v$ (Hz/volt), then the frequency f of the pulse train $P_3(t)$ is:

$$f = K_v \cdot V_o \qquad (6)$$

$$= \frac{K_v \cdot N \cdot P}{2\pi} \cdot \Theta_e$$

The combination consisting of the sampler 21, the up-down counter 22, and the D/A converter 23 are referred to as an adaptive digital pump controller (ADPC). The combination consisting of the ADPC and the VCO 30 is referred to as a phase-controlled oscillator (PCO), in view that the frequency of a periodic pulse train generated thereby is proportional to the input phase error. The ADPC is for use in a phase-locked servo system in place of RC filters and high line-density encoders. For a more detailed description of the ADPC, readers should direct to a technical paper entitled "AN ADAPTIVE DIGITAL PUMP CONTROLLER FOR PHASE-LOCKED SERVO SYSTEMS" published on IEEE TRANSACTIONS ON INDUSTRIAL ELECTRONICS, Vol. IE-34, No. 3, August 1987, by Hsieh et al, Dr. Hsieh being also the inventor of the present invention.

The output pulse train $P_3(t)$ of the VCO 30, before being used to drive the step motor 50, is processed by a divide-by-$N_1$ frequency divider 31. The value for the number $N_1$ is determined in accordance with characteristics of the step motor 50 to reduce the frequency of the pulse train $P_3(t)$ to a lower frequency value suitable for driving the step motor 50.

The control mechanism established by step motor speed servo control system shown in FIG. 1 is referred to as a phase-locked stepping servomechanism (PLSS). A theoretical analysis of the PLSS and a design procedure for determining optimum values for the parameters N, P, and $K_v$ are described hereinunder.

2. Modeling of the Step Motor

If the VCO 30 is operated in a linear region, the VCO 30 can be viewed to have a constant sensitivity value $K_v$. From the aforementioned technical paper, the mathematical model of the ADPC is:

$$G(z)_N = \frac{V_c(z)_N}{\Theta_e(z)_N} \qquad (7)$$

$$= \left(\frac{1}{z_N - 1}\right) \cdot P \cdot Sgn(\Theta_e)$$

$$G(z)_N = G(z) \bigg|_{\substack{z = z1/N \\ T = T/N}} \qquad (8)$$

where $\Theta_e(z)$ is the z-transform of the phase error $\Theta_e$, and $V_c(z)$ is the z-transform of the output voltage $V_c$ of the ADPC 20.

$$\frac{w_0(s)}{w_i(s)} = \frac{(r/L_p)w_{np}^2}{s^3 + (r/L_p + D/J)s^2 + [(r/L_p)(D/J) + w_{np}^2(1 + kp)]s + (r/L_p)w_{np}^2} \qquad (9)$$

$kp \rightarrow 0$ $$\frac{w_0(s)}{w_i(s)} = \frac{(r/L_p)w_{np}^2}{(s + r/L_p) \cdot (s^2 + D/J \cdot s + w_{np}^2)} \qquad (10)$$

$$\frac{w_0(s)}{w_i(s)} = \frac{w_{np}^2}{s^2 + D/J \cdot s + w_{np}^2} \quad (11)$$

$$\frac{w_0(s)}{f_i(s)} = \frac{K_m}{s^2 + 2bs + c} \quad (12)$$

where b is the parameter related to the rotational inertia and viscous braking coefficient of the step motor 50;

c is the magnetic and electric parameter of the step motor 50;

$K_m/c$ is the DC gain (rad/Hz) of the step motor 50;

$f_i = w_i/2\pi$

3. Mathematical Analysis of the PLSS

Figure 8:
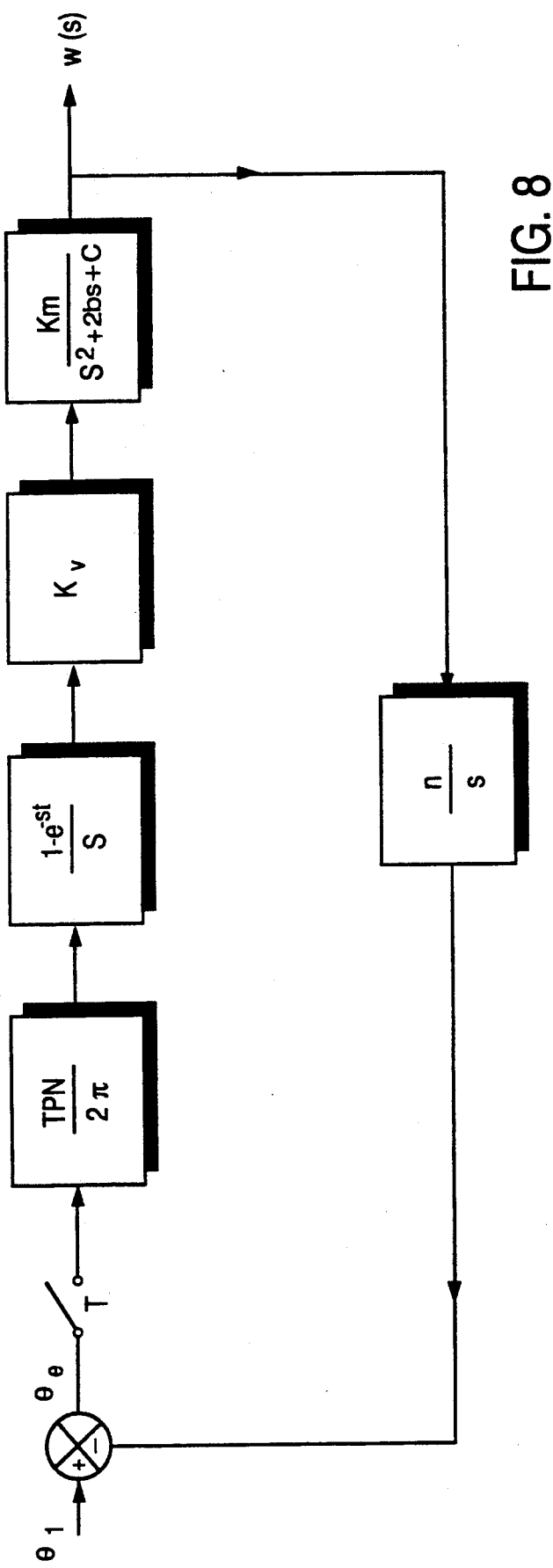
FIG. 8 is a linear equivalent model of the block diagram of FIG. 1.

Suppose that the PLSS system is in the steady state with small phase error, i.e. in the phase-locked range, then the block diagram of FIG. 1 is equivalent to that shown in FIG. 8. From FIG. 8, the loop gain can be derived as:

$$GH(s) = \frac{nTNPK_vK_m}{2\pi} \cdot \frac{1 - e^{-sT}}{s^2(s^2 + 2bs + c)} \quad (13)$$

The z-transform expression of Eq. (13) is obtained as:

$$GH(z) = A \cdot \frac{L_1 z^2 + L_2 z + L_3}{(z-1) \cdot (z^2 - 2D\cos(ET)z + D^2)} \quad (14)$$

where $L_1 = 2bDE \cos(ET) - 2bE + cET + 2b^2D \sin(ET) - cD \sin(ET)$ (15)

$L_2 = 2bDE - 2cDET \cos(ET) - 2bD^2E - 4b^2D \sin(ET) + 2CD \sin(ET)$ (16)

$L_3 = cD^2ET + 2bD^2E - 2bDE \cos(ET) + 2b^2D \sin(ET) - cD \sin(ET)$ (17)

The forward gain is derived as:

$$G(s) = \frac{TNPK_vK_m}{2\pi} \cdot \frac{1 - e^{-sT}}{s(s^2 + 2bs + c)} \quad (18)$$

and the z-transform expression thereof is obtained as:

$$G(z) = \frac{Ac}{n}\left[\frac{N_1 z + N_2}{z^2 - 2D\cos(ET)z + D^2}\right] \quad (19)$$

where $N_1 = E - DE \cos(ET) - bD \sin(ET)$ (20)

$N_2 = D^2E - DE \cos(ET) + bD \sin(ET)$ (21)

Therefore, in accordance with Eq. (14) and Eq. (19), the closed-loop transfer function is:

$$T(z) = \frac{w(z)}{\Theta_i(z)} = \frac{G(z)}{1 + GH(z)} \quad (22)$$

$$= \frac{Ac(z-1)}{n}\left[\frac{N_1 z + N_2}{z^3 + Q_1 z^2 + Q_2 z + Q_3}\right]$$

where $Q_1 = 2AbDE \cos(ET) + AcET + 2Ab^2D \sin(ET) - 2AbE - AcD \sin(ET) - 2D \cos(ET) - 1$ (23)

$Q_2 = 2AbE - 2AcDET \cos(ET) - 4Ab^2D \sin(ET) + D^2 - 2AbD^2E + 2AcD \sin(ET) + 2D \cos(ET)$ (24)

$Q_3 = 2AbD^2E - D^2 - 2AbDE \cos(ET) + AcD^2ET + 2Ab^2D \sin(ET) - AcD \sin(ET)$ (25)

and $E = (c - b^2)^{\frac{1}{2}}$ (26)

$D = c^{-bT}$ (27)

$$A = \frac{nTNPK_vK_m}{2c^2E\pi} \quad (28)$$

Equating the denominator of Eq. (22) to zero to obtain the characteristic equation, i.e. letting $1 + GH(z) = 0$, the following result is obtained:

$z^3 + [2AbDE\cos(ET) - 2AbE + 2AbE + AcET + 2Ab^2D\sin(ET) - AcD\sin(ET) - 2D\cos(ET) - 1]z^2 + [2AbE - 2AbD^2E + D^2 - 2AcDET\cos(ET) - 4Ab^2D\sin(ET) + 2D\cos(ET) + 2AcDET\cos(ET) + [-D^2 + 2AbD^2E - 2AbDE\cos(ET) + AcD^2ET + 2Ab^2D\sin(ET) - AcD\sin(ET)] = 0$ (29)

In order to consider the stability of the PLSS, the bilinear transformation $z = (1+s)/(1-s)$ with $T = 2\pi/nw$ is utilized and the Routh Hurwitz criterion is applied. The result leads to the following relationship:

$$U_0 s^3 + U_1 s^2 + U_2 s + U_3 = 0 \quad (30)$$

where $U_0 = 2 - BcE/nw - [BcDE\cos(E/nw)]/nw - 4BbD^2E + 2D^2 - BcD^2E/nw + 3BbE + 4D\cos(E/nw) - 8Bb^2D\sin(E/nw) + 4BcD\sin(E/nw) > 0$ (31)

$U_1 = 4 - BcE/nw + 2BcDE\cos(E/nw)/nw + 8BbD^2E - 8BbDE\cos(E/nw) + 3BcD^2E/nw - 4D^2 + 8Bb^2D\sin(E/nw) - 4BcD\sin(E/nw) > 0$ (32)

$U_2 = BcE/nw + [2BcDE\cos(E/nw)]/nw - 3BcD^2E/nw - 4BbE + 2 - 4BbD^2E + 2D^2 - 4D\cos(E/nw) + 8BDE\cos(E/nw) > 0$ (33)

$U_3 = BcE/nw - [2BcDE\cos(E/nw)] + nw + BcD^2E/nw > 0$ (34)

$U_1 U_2 > U_0 U_3$ (35)

Figure 9:
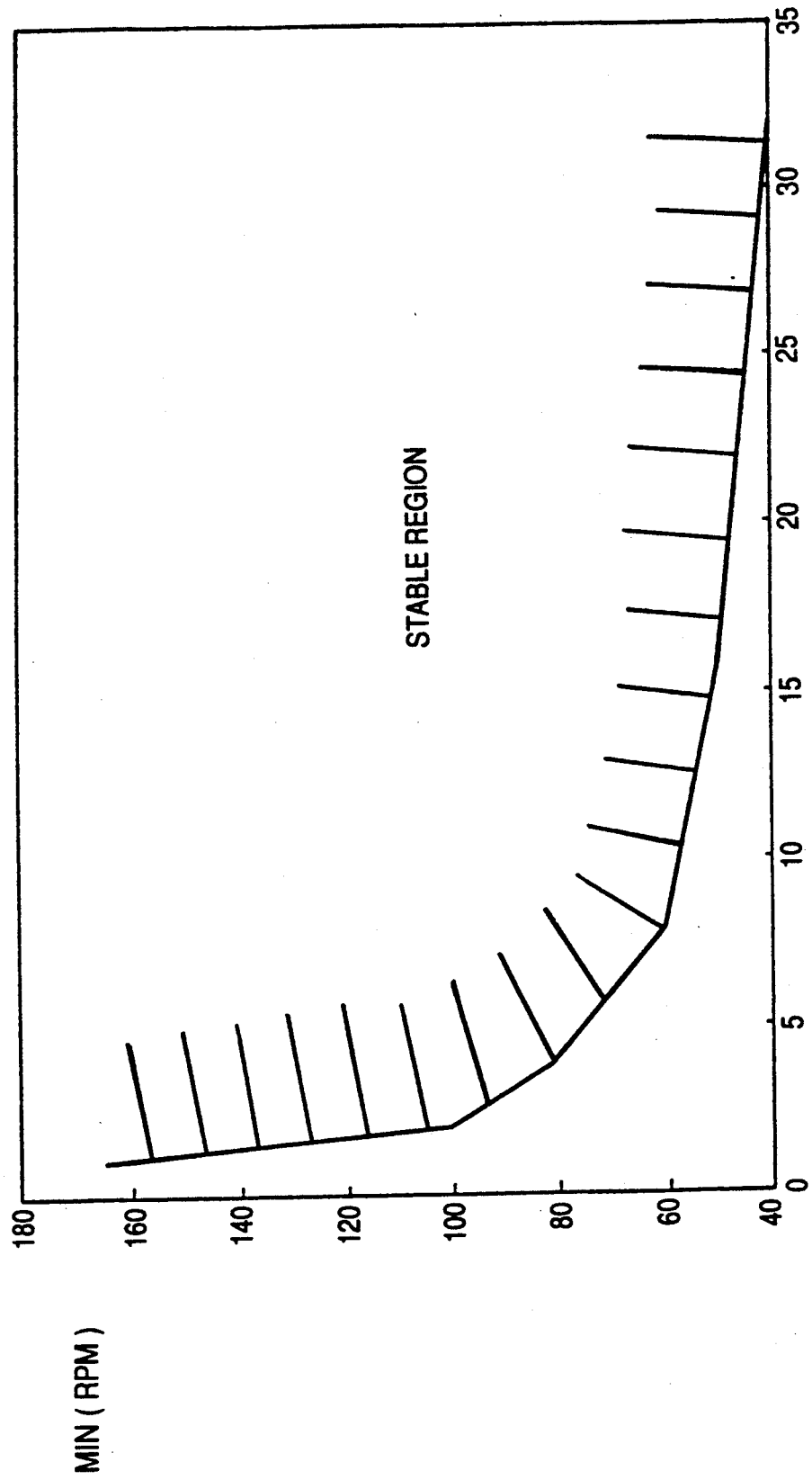
FIG. 9 is a graph, showing stable regions of the step motor servo control system of FIG. 1.
Figure 10A:
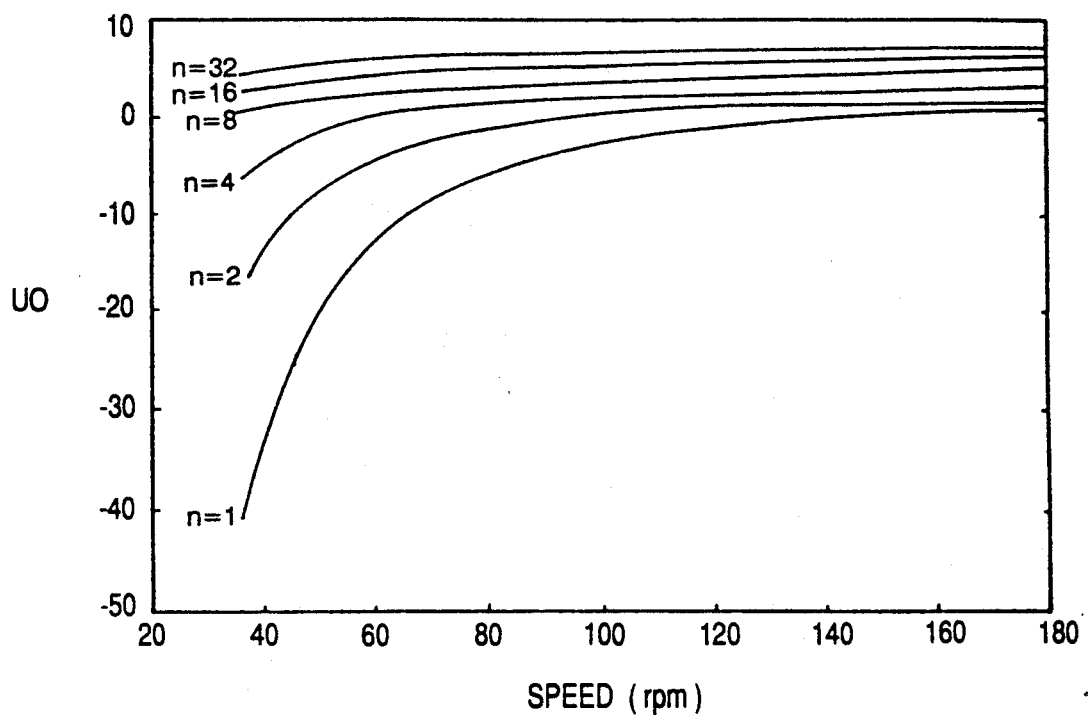
FIGS. 10A-10D are graphs in which plotted curves representing characteristics of system stability versus line density.
Figure 10B:
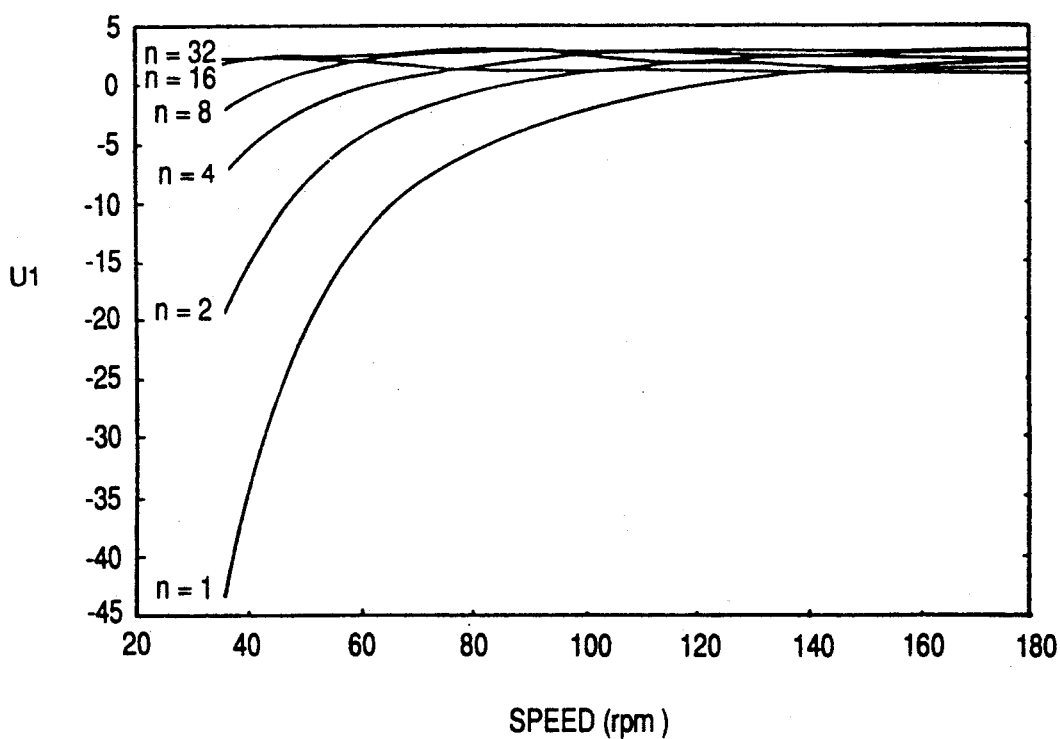
Figure 10C:
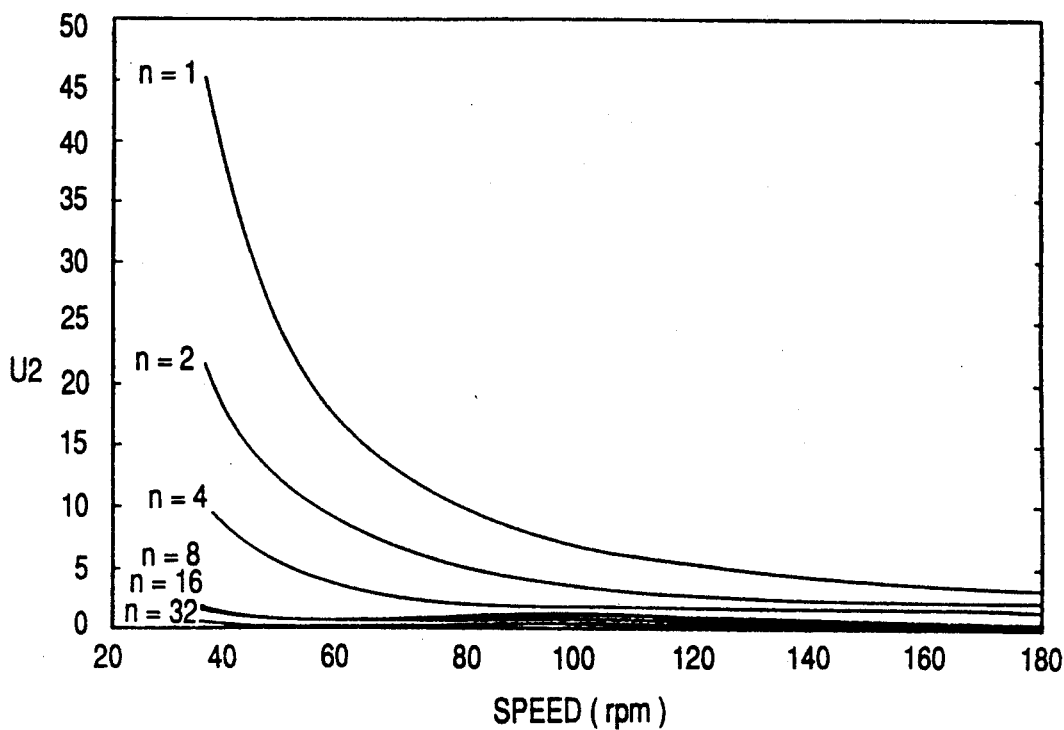
Figure 10:
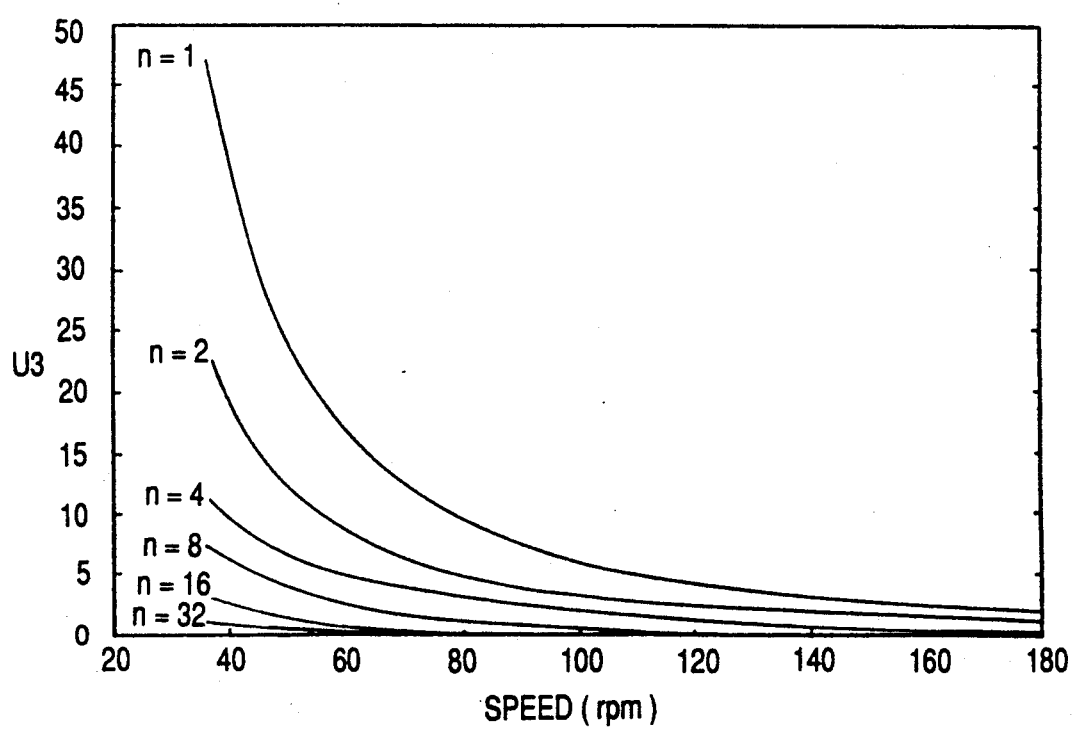

For a given n, the minimum speed $w_{min}$ above which the PLSS system is stable can be computed from Eqs. (31)–(35). The result is shown in FIG. 9. It is observed from the graph that the larger the line density n, the lower the minimum speed $w_{min}$.

If the phase $\Theta_r(t)$ of the reference signal is a ramp function of $Rtu_s(t)$, the system of FIG. 8, according to the definition in the textbook of "*DIGITAL CONTROL SYSTEM*" by Benjamin C. Kuo, is a Type 1 system. Therefore, the steady-state error is:

$$e_{ss} = \frac{R}{K_v} \qquad (36)$$

where $$\begin{aligned} K_v &= \frac{1}{T} \lim_{z \to 1} [(z-1)GH(z)] \\ &= \frac{A(L_1 + L_2 + L_3)}{T[1 + D2 - 2D\cos(ET)]} \end{aligned} \qquad (37)$$

4. The PLSS System Design Procedures

The purpose of the above-described PLSS system is to control the speed of the step motor 50. The step motor 50 is a very nonlinear device whose transfer function is with a high order.

In the following description, for the detailed definitions of the parameters N, P, NP, and T, readers should refer to the aforementioned technical paper on ADPC.

In the design of the PCO, the selection of the values of the parameters N and P is very important, where N is the sampling rate and P is the jump voltage which is the quantized level of the voltage $V_c$ in the ADPC system. The sensitivity of T(z) with respect to P is:

$$S_p^{T(z)} = \frac{T(z)}{p} \cdot \frac{P}{T(z)} = S_p^{N(z)} - S_p^{D(z)} \qquad (38)$$

where T(z) is expressed in Eq. (22), and therefore:

$$S_p^{T(z)} = \frac{z^3 + [-1 - 2D\cos(ET)]z^2 + [D^2 + 2D\cos(ET)]z - D^2}{z^3 + Q_1 z^2 + Q_2 z + Q_3} \qquad (39)$$

The speed variation of the step motor is directly affected by the parameter P. Therefore, P must be so selected such that the frequency of the pulse train input to the step motor would vary within a tolerance of ±3 Hz. The parameter NP determines the maximum output voltage of the ADPC, which is normally between 5 and 30 volt.

Once a set of values for the parameters N and P has been determined, the values of N and P are substituted into the transfer function of Eq. (22) to see if the system response satisfies the system requirements. If not, another set of values will be determined until the system response in accordance therewith satisfies the system requirements.

The design procedure for the PLSS is described hereinunder, which includes the following steps of:

STEP 1 determining the maximum range of the output frequency of the PCO in accordance with:
(a) the parameters b, c of the step motor which is to be controlled,
(b) the speed range of the PLSS system,
(c) the gain Km of the step motor, and
(d) the gain Kv of the VCO;

STEP 2

(a) choosing the feasible line density n;
(b) determining $w_{min}$ according to the graph of FIG. 9;
(c) computing $T_{max}$, where $T_{max} = 2\pi/(n * w_{min})$;

STEP 3

(a) determining the speed w by the following relationship:

$$w = G_{dc}\Theta_e \qquad (35)$$

where $$G_{dc} = \frac{NPK_vK_m}{2\pi c} \qquad (34)$$

$$\Theta_e = \frac{2\pi N'}{N} \qquad (36)$$

(b) determining the speed jump ※w by $$\text{※}w = \frac{PK_vK_m}{c} \qquad (37)$$

(c) determining N by N=NP/P;

STEP 4 designing the phase detector 10, the ADPC (the sampler 21, the up-down counter 22, and the D/A converter 23), the VCO 30 and the wave-shaping circuit 34 in accordance with the parameters determined at the Steps (1)-(3);

STEP 5 determining the optimum line density n by utilizing a computer simulation software package with the parameters as the input data;

STEP 6 computing the closed-loop transfer function of Eq. (22) with the parameters of P, N, T, Kv, Km, b, and c;
performing the computer simulation for the speed response with the ramp function as the input to the phase detector, and subsequently comparing the outcome results with the system requirements of the speed resolution, the maximum overshoot, the settling time, and the steady-state response;
if the system requirements are fully met, designing the PLSS system with the outcome results; otherwise, repeating from the STEP (1) once again to find another set of parameters which are feasible.

5. An Embodiment of the PLSS

The step motor 50 which is to be controlled has b=10 rad/sec and c=200 (rad/sec)². The step motor 50 is of a half-step excitation type and thus one pulse input thereto will drive the shaft thereof to rotate an angular displacement of 0.0157 rad. Therefore, 400 pulses input to the step motor will drive the shaft thereof to rotate a complete revolution.

A tachometer, which is a type that comprises an optical sensor, is coupled to the step motor 50 for detecting the speed thereof. This type of tachometer is well known in the industry that the detailed description of the structure thereof will be omitted. The tachometer produces a train of 200 pulses if the shaft of the step motor 50 rotates one complete revolution. Accordingly, the maximum line density is $n=200/2\pi=32$.

For the PCO, when a phase with a ramp function is input to the system, it is required that:
(a) the steady-state error be less than 2%;
(b) the maximum overshoot be less than 10%;
(c) the rise time be less than 2 seconds;
(d) the settling time be less than 3 seconds;
(e) the speed jump be less than 0.0471 rad/sec; and
(f) the speed be within the range from 40 rpm to 1000 rpm.

The VCO utilized has a gain of $K_v=454$ Hz/V. Since a single pulse input to the step motor will drive the shaft thereof to rotate an angular displacement of 0.0157 rad, to drive the step motor to rotate at the maximum speed of 1000 rpm, the VCO needs to output a train of pulses with a frequency of:

$$\frac{(1000/60) * 2\pi}{0.0157} = 6666.67 \text{ pulses per second.}$$

Consequently, the output voltage of the ADPC corresponding to this frequency output of the VCO should be:

$$V_c = \frac{6666.67 \text{ (Hz)}}{454 \text{ (Hz/V)}} = 14.68 \text{ volt}$$

The value of the parameter NP is therefore chosen to be 15 V.

Next, a suitable value is chosen for the parameter n and the values of the parameters b and c are substituted into the four inequalities (31)–(34). The computer simulation output for the four inequalities are shown in FIGS. 10A–10D, the curve in each graph being plotted respectively for $n=1, 2, 4, 8, 16$, and 32. In accordance with the computer simulation output, the relationship between the minimum speed $w_{min}$ of the step motor which would assure a stable operation for the control system and the encoder line density n is shown in the graph of FIG. 9. Accordingly, from the graph, $w_{min}=165$ rpm when $n=1$, the maximum sampling period $T_{max}$ of the control system is:

$$\begin{aligned} T_{max} &= 1/(n * w_{min}) \\ &= 1/(1 * 165/60) \\ &= 0.36 \text{ sec} \end{aligned}$$

From Eq. (43), $P*K_v*K_m c=0.0471$, and therefore P is equal to 0.0066. The value of the jump voltage can be rounded and chosen to be $P=3$ mV. And the sampling number is therefore $N=NP/P=15/0.006=2500$.

The usable values of b, c, and n' are listed in TABLE 1 below.

TABLE 1

| Speed Range | b (rad/sec) | c (rad/sec)² | n' |
|---|---|---|---|
| 40–60 rpm | 50 | 15000–9000 | 32 |
| 70–90 rpm | 40 | 4500–2500 | 32 |
| 120–180 rpm | 30 | 2400–1200 | 8, 4 |
| 210–300 rpm | 20 | 900–500 | 4, 2 |
| 330–390 rpm | 10 | 425–200 | 2, 1 |
| 420–480 rpm | 9 | 180–140 | 1 |

Figure 11A:
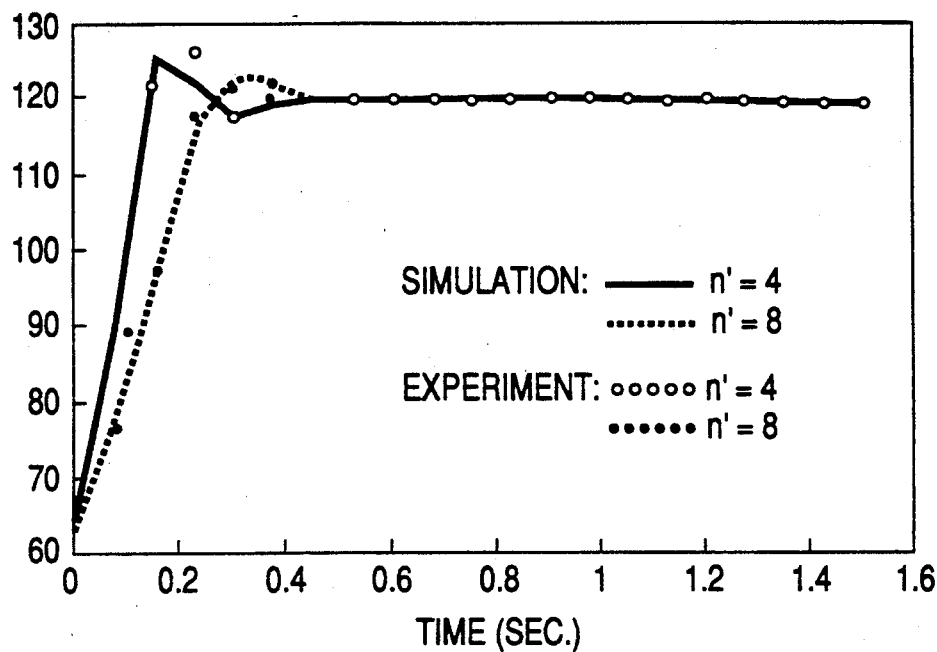
FIG. 11A is a graph, showing speed response for 120 rmp of a step motor controlled by the servo control system of FIG. 1.
Figure 11B:
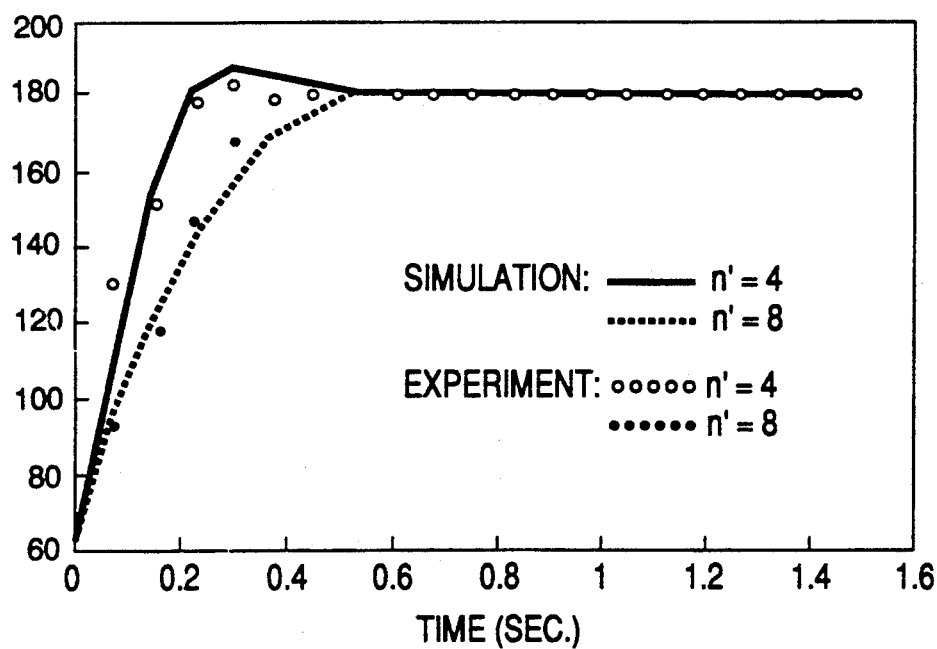
FIG. 11B is a graph, showing speed response characteristic for 180 rmp of a step motor controlled by the servo control system of FIG. 1.

A graph showing speed response characteristic for 120 rmp of a step motor controlled by the servo control system of FIG. 1 is shown in FIG. 11A; and a graph showing speed response characteristic for 180 rmp of a step motor controlled by the servo control system of FIG. 1 is shown in FIG. 11B.

The present invention has been described hitherto with an exemplary preferred embodiment. However, it is to be understood that the scope of the present invention need not be limited to the disclosed preferred embodiment. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A servo control system for controlling the speed of a step motor, comprising:
   (a) means for detecting angular speed of the step motor, said detecting means adapted to generate a first pulse train with a frequency indicative of the angular speed of the step motor;
   (b) a reference signal source adapted to generate a second pulse train with a preset frequency;
   (c) means for generating a phase error signal in accordance with phase difference between the first pulse train and the second pulse train, during each one period defined by the preset frequency of the second pulse train, said phase error signal generating means being adapted to generate a group of pulses with a pulse number in proportion to the phase error detected during the same one period, the group of pulses having oscillation with positive polarity when a phase lead is detected and negative polarity when a phase lag is detected;
   (d) an up-down counter coupled to said phase error signal generating means, said up-down, counter adapted to count in the up direction if one pulse received thereby has oscillation in the positive direction and in the down direction if one pulse received thereby has oscillation in the negative polarity; and
   (e) means for generating a signal for control of the speed of the step motor, the control signal consisting of a pulse train having a frequency in proportion to the output count number of said up-down counter.

2. The servo control system for controlling the speed of a step motor as recited in claim 1, wherein said phase error signal generating means comprises:
   a phase detector adapted to generate a square wave during each one period defined by the second pulse train with a duty cycle in proportion of the phase error detected during the same one period, a polarity of the square wave being in accordance with the polarity of the group of pulses representative of the detected phase error; and
   means for sampling the square wave with a predetermined sampling frequency into a group of pulses; and
   said control signal generating means includes:
   a D/A converter coupled to the output of said up-down counter and adapted to convert the output of said up-down counter into a proportional voltage, and
   a voltage controlled pulse generator coupled to the output of the D/A converter and adapted to generate a pulse train having a frequency in proportion to the voltage output by said D/A converter.

3. The servo control system for controlling the speed of a step motor as recited in claim 2, wherein said sampling means has a predetermined sampling frequency to sample the phase error signal of N times the frequency of the reference signal, N being an integer number selected in accordance with:

$$N = NP/P,$$

where
NP is the maximum output-conversion voltage of the D/A converter, and
P is a permissible quantized level.

* * * * *

UNITED STATES PATENT AND TRADEMARK OFFICE
CERTIFICATE OF CORRECTION

PATENT NO.   : 5,212,434

DATED        : May 18, 1993

INVENTOR(S)  : Guan-Chyun Hsieh

It is certified that error appears in the above-identified patent and that said Letters Patent is hereby corrected as shown below:

Col. 7, line 43; "2bDE" should be --2bE--.

Col. 11, line 52; "3 mV." should be --6 mV.--.

Signed and Sealed this

Sixteenth Day of May, 1995

Attest:

BRUCE LEHMAN

Attesting Officer                Commissioner of Patents and Trademarks